Aug. 17, 1943.   D. SAMIRAN   2,326,803
POSITIVE DISPLACEMENT PUMP FOR METERING
Filed March 18, 1941   2 Sheets-Sheet 1

INVENTOR
DAVID SAMIRAN
BY Edgar H. Goodpasture
 and Wade Knotts
ATTORNEYS

Aug. 17, 1943.   D. SAMIRAN   2,326,803
POSITIVE DISPLACEMENT PUMP FOR METERING
Filed March 18, 1941   2 Sheets-Sheet 2
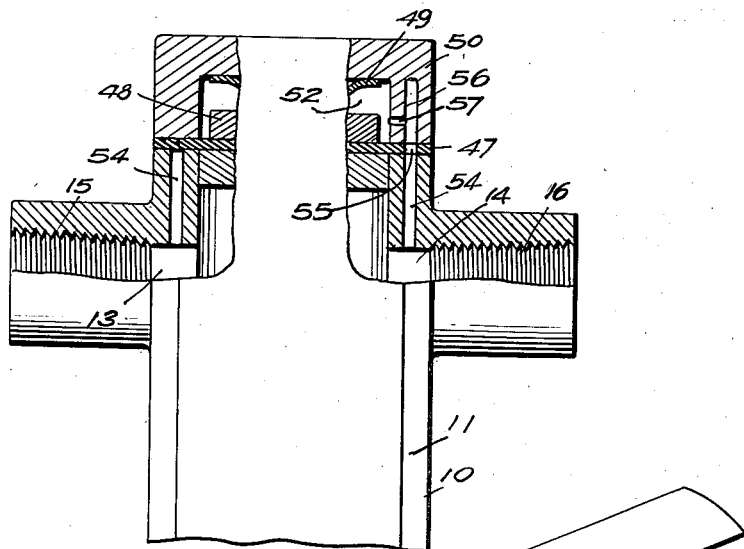
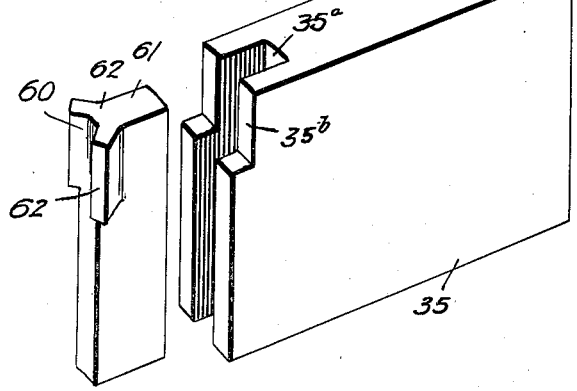
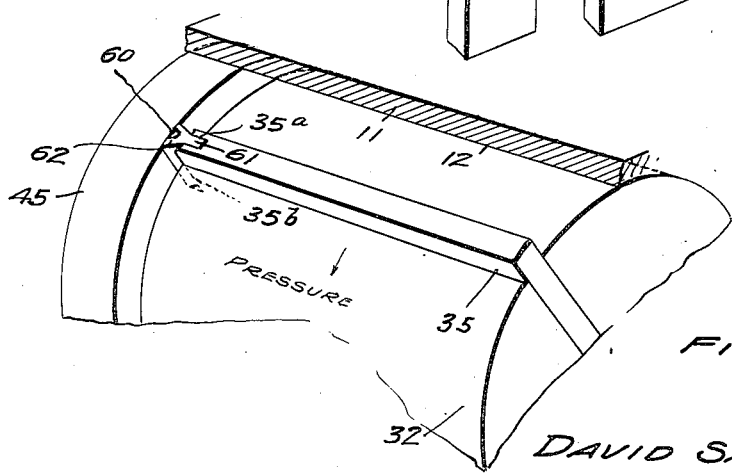
INVENTOR
DAVID SAMIRAN Patented Aug. 17, 1943

2,326,803

UNITED STATES PATENT OFFICE 2,326,803

POSITIVE DISPLACEMENT PUMP FOR METERING

David Samiran, Dayton, Ohio
Application March 18, 1941, Serial No. 383,977

1 Claim. (Cl. 103—136)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improved rotary pump in which leakage losses are reduced to such an extent that the pump may be employed for pumping fuel from a source of fuel supply to a delivery conduit and measuring the quantity of fuel being pumped by counting the number of revolutions made by the pump and determining the rate of fuel delivery by determining the velocity of the pump rotor by means of a tachometer.

In aircraft fuel system it is of great importance to be able to determine the quantity of fuel consumed by the power plant and also to determine the rate of fuel consumption to check on whether the fuel mixture is proper for the existing operating conditions. In the fuel systems heretofore employed it has been necessary to insert both a quantity meter and a flow meter in the fuel delivery line to measure the quantity of fuel consumed as well as the rate of consumption, since the fuel pump included a by-pass controlled by a pressure relief valve and hence its displacement had no relation to the quantity of fuel delivered to the engine. The insertion of meters of the above type in the delivery line caused an increased pressure drop amounting to as much as two pounds per square inch and added as much as ten pounds to the weight of the fuel system components, apart from any remote indicating equipment. Further the adding of resistance in the fuel lines greatly accentuated the difficulties encountered with vapor locking in the fuel systems of air-craft intended to operate at high altitudes. With the development of automatically controlled remote drive fuel pump systems such as illustrated in my United States Patent 2,229,132, in which the speed of the fuel pump is automatically controlled to maintain a constant pressure in the fuel delivery line irrespective of fuel demand, the necessity for the use of the conventional relief valve with the attendant vapor locking troubles was eliminated and it became apparent that if a pump could be developed having a sufficiently high volumetric efficiency, the pump could be directly employed as a fuel quantity meter so that separate meters would not be required. Reciprocating piston pumps cannot be employed in an automatically controlled fuel system of the character above described due to fluctuating delivery pressure unless of the type having a large number of cylinders, and such a pump cannot be used as a meter unless provided with mechanically actuated valve mechanism, thus making the pump very expensive to construct. The gear type pump has such a poor volumetric efficiency that it cannot be employed as a meter, so that a movable vane type pump has been developed in which special attention has been devoted to sealing features which reduce the leakage losses to such an extent, that it now becomes possible to employ the pump for the dual function of a fuel pump and a meter, counting the number of revolutions of the pump to determine fuel delivered by the pump and employing a tachometer for measuring speed of the pump in terms of the rate of delivery.

The principal object of the invention is the provision in a movable vane rotary pump for pumping and metering fluids of a pump rotor having radially movable vanes mounted in the sump casing of novel sealing means for preventing leakage of liquid from the discharge to the inlet side of the pump along the radial contact faces of the pump vanes.

A further object of the invention is the provision of a sealing means for the radial contact face of a movable pump vane, in which the sealing means is made of resilient material in the form of a rectangular body portion adapted to be inserted into a corresponding groove on the radial face of the vane, the body portion being provided with laterally extending flanges which overlie at least a portion of the radial face of the vane, the said flanges being flared outwardly to form a cup shaped contact surface on their outer faces and leaving a clearance space on their rear faces adapted to be subjected to fluid pressure from the fluid within the pump to maintain a sealing pressure on the contact face of at least one of the flanges.

Other objects of the invention not specifically enumerated above will appear by reference to the detailed description in the specification and to the appended drawings in which:

Fig. 4 is a top plan view partly in section of the pump illustrated in Fig. 2.

Fig. 5 is a perspective view illustrating a novel seal for the vanes of the pump of Fig. 2; and Fig. 6 is a perspective view illustrating the action of the sealing means illustrated in Fig. 5.

Figure 1:
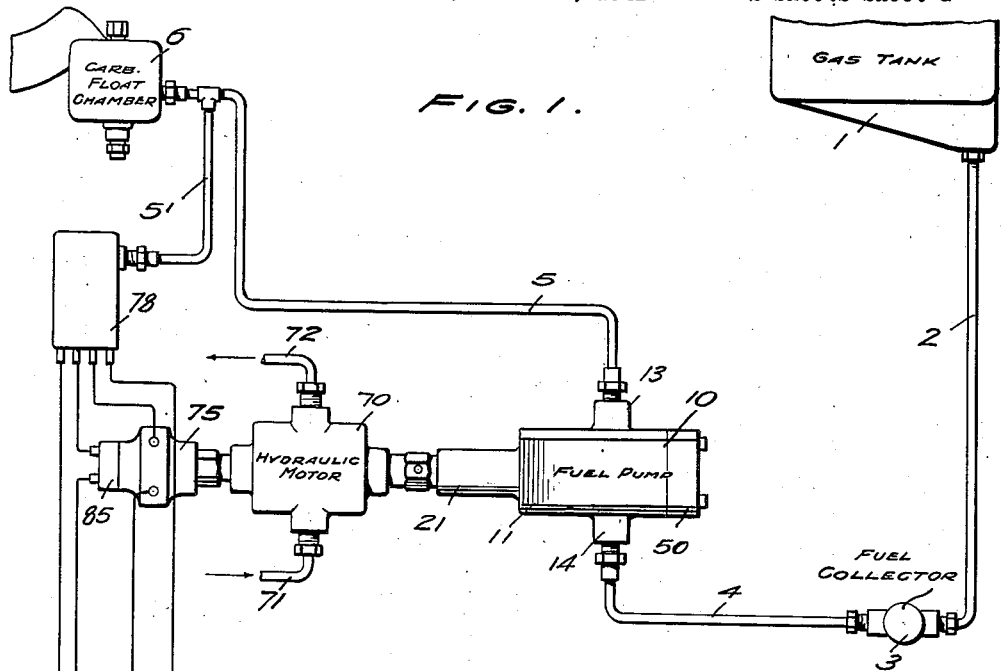
Fig. 1 is a diagrammatic illustration of a portion of an automatic fuel system in which a pump in accordance with the invention is employed for the dual function of both pumping and metering fuel.

Referring to Fig. 1 which illustrates a portion of an automatic fuel system employing a pump in accordance with the present invention, the reference numeral 1 indicates a fuel supply tank connected by means of a conduit 2 to a fuel collector 3 which may incorporate fuel shut-off cocks (not shown). Fuel from the collector 3 is drawn into the inlet side of the fuel pump, generally indicated by the reference numeral 10, through a conduit 4 and fuel is discharged by the pump into a delivery conduit 5 which is connected to the float chamber of an aircraft engine carburetor 6 which supplies fuel for consumption by the associated aircraft engine. The pump 10, which forms the subject matter of the present invention, is adapted to be driven by means of a hydraulic motor 70 which has its inlet side connected by means of a conduit 71 and its outlet side connected by means of a conduit 72 respectively to the outlet and inlet sides of a suitable engine driven pressure generator or pump (not shown). The quantity of fluid admitted to the motor 70 and hence its speed being controlled by means of an automatic pressure responsive control device subjected to the variation in pressure in the pump delivery line 5 adjacent the point of delivery to the carburetor float chamber 6. Such pressure generator and control device are not illustrated, being fully described in my afore-mentioned United States Patent No. 2,229,132. The function of the automatic control is to maintain the speed of the hydraulic motor, and hence the speed and output of the fuel pump 10, such that the fuel pressure in the delivery conduit 5 at the point of delivery to the engine carburetor remains substantially constant irrespective of the demand for fuel by the engine, eliminating the customary relief valve with its attendant disadvantages. The fuel pump 10 is so constructed, as hereinafter more fully described, that it constitutes a positive displacement pump having a very high volumetric efficiency over its entire range of speed so that by counting the number of revolutions of the pump the quantity of fuel delivered by the pump from the fuel supply to the engine carburetor for consumption by the engine may be readily determined in terms of gallons of fuel consumed or other convenient measuring units. It is also possible to determine the rate of fuel consumption by the engine by simply measuring the velocity of the pump by means of a suitable tachometer which indicates the pump speed in terms of the rate of fuel consumption such as gallons per hour. In order to measure the pump speed and hence the rate of fuel consumption a tachometer-generator 75 of well-known construction is secured to an extension driving shaft of the hydraulic motor 70 so that the armature of the tachometer-generator rotates in unison with the motor driving shaft and the rotor of the fuel pump. The tachometer-generator 75 is electrically connected in series with one switch element of a two circuit pressure responsive switch 78 and with an indicator 80 which is constructed as a volt meter and together with the tachometer-generator 75 forms an electric tachometer or speed measuring device well-known in the art. The pressure responsive switch 78 of a well-known construction, is connected by means of a branch conduit 5' to the delivery conduit 5 adjacent the carburetor 6 and is operative to close the electrical circuit between the tachometer-generator 75 and the indicator 80 only upon a predetermined fuel pressure in the conduit 5 having been attained. The indicator 80 is graduated, instead of in terms of speed, to indicate the fuel consumption in terms of gallons per hour or other convenient unit indicative of the rate of fuel consumption by the associated engine. The indicator 80 will give a close approximation of the instant rate of fuel consumption because of the fact that the fuel pump 10 is so designed that one revolution thereof displaces a definite volume of fuel so that the number of revolutions per unit of time determines the rate of delivery of fuel to the engine carburetor 6, and hence the rate of fuel consumption by the engine. In order to measure the quantity of fuel displaced by the pump 10 a cam-actuated switch device 85 is incorporated with the tachometer-generator 75 to be driven thereby at a reduced speed, the cam-actuated switch being so designed that it closes an electrical circuit once in a predetermined number of revolutions of the pump 10, for example the number of revolutions of the pump corresponding to the delivery of one gallon of fuel. The cam-actuated switch 85 is electrically connected in series with a second switch device incorporated in the pressure responsive switching device 78 and also connected to a conventional solenoid actuated counting device 90, the circuit including a battery or other source of direct current (not shown). The counting mechanism 90 is operative to indicate each gallon of fuel delivered by the pump 10 to the conduit 5 and by means of a suitable dial mechanism indicates the total number of gallons delivered by the pump since it was started. The counter mechanism 90 may be of any well-known construction and incorporates a suitable resetting mechanism (not shown). The pressure responsive switch device 78 is also operable to close the circuit between the cam-actuated switch 85 and the electrical counter mechanism 90 only upon the fuel pressure in conduit 5 at the point of delivery exceeding a minimum pressure, so that both the counter mechanism and the tachometer electric circuits are inoperative when the fuel pump is not delivering fuel to the engine carburetor.

The above described fuel system, apart from the pump 10, forms no part of the present invention, but illustrates the manner in which the novel fuel pump is utilized to serve the dual function of a pump and a meter, and the specific construction of the fuel pump 10, whereby its volumetric efficiency may be maintained sufficiently high in order to accomplish its metering function, will now be described.

Figure 2:
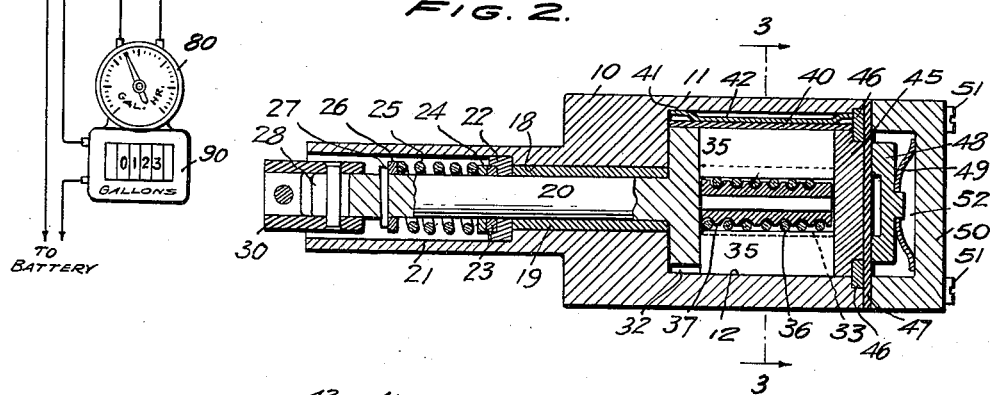
Fig. 2 is a partial longitudinal sectional view of a pump in accordance with the invention.
Figure 3:
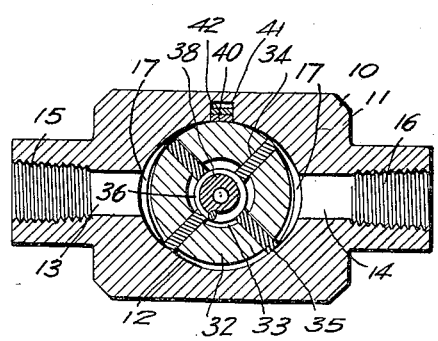
Fig. 3 is a transverse sectional view taken on line 3—3 of Fig. 2.

Referring now to Figs. 2 and 3, the rotary pump generally indicated by the reference numeral 10 is seen to comprise a generally cylindrical pump body or casing 11 provided with the central substantially cylindrical cavity 12, forming a pump chamber and, as seen in Fig. 3, the chamber 12 communicates with the diametrically disposed ports 13 and 14, which extend into respective threaded bosses 15 and 16, and the ports 13 and 14 alternately serving as inlet and discharge ports depending upon the direction of rotation of the pump rotor. The ports 13 and 14 are each enlarged at the point of communication with the chamber 12 by means of the arcuate recess 17 cut into the chamber wall. The pump body 11 is provided with a longitudinally extending bore 18 into which is pressed a suitable bronze bushing 19 which serves as a journal for the pump rotor driving shaft 20. The pump casing 11 is provided with an annular sleeve-like extension 21 which serves to house the outer end of the rotor shaft 20 and also serves to house a shaft sealing means comprising a cup-shaped sealing gasket 22 made of synthetic rubber, which is held by a retaining ring 23 made of bronze or suitable antifriction material, into abutting engagement with the end of the bearing sleeve 19 and also in sealing engagement with the periphery of the shaft 20 to prevent leakage of fluid axially along the shaft. The retaining ring 23 is engaged by a spring abutment washer 24, which is urged into engagement with the retainer ring 23 by means of the spring 25 concentrically arranged on the shaft 20 and having its outer end resting against an abutment washer 26 which is restrained against axial movement along the shaft by means of a taper pin 27. The spacing between the spring abutment washers 24 and 26 is so arranged that the initial compression loading of the spring is sufficient to maintain the proper force on the retainer ring 23 to insure sealing engagement of the gasket 22 with the bearing sleeve 19 and the rotor shaft 20. At its outer end the rotor shaft 20 is suitably slotted as at 28 to engage a suitable universal coupling 30 which may be connected to the hydraulic motor 70, Fig. 1, to drive the rotor shaft 20. The axis of rotation of the rotor shaft 20 is arranged to be eccentric with respect to the longitudinal axis of the pump chamber 12 and the shaft is provided at its inner end with a rotor 32 integrally formed therewith. The rotor 32 is arranged in the form of a cylindrical annulus having a centrally disposed cylindrical cavity 33 and is suitably longitudinally slotted as at 34 to accommodate the radial movable vanes 35 (see Fig. 3), the outer portions of the vanes 35 contacting the walls of the pump chamber 12 and on their inner ends being in contact with an axially disposed floating coil spring 36 which is wound on a threaded core member 38 and located in the rotor cavity 33. The depth of the threads 37 (Fig. 2) of the core member 38 being cut sufficiently deep that the coil spring 36 when moved radially inward may come substantially flush with the outer periphery of the core member. The coil spring 36 is made slightly less in length than the core member 38 so that as the spring is compressed radially inward it may increase its axial length. The spring and core member 38 freely float in the cavity or chamber 33 formed in the pump rotor 32 and the coil spring serving as a means for constantly yieldingly urging the pump vanes 35 into contact with the walls of the pump chamber 12. The provision of the coil type of spring allows the shape of portions of the pump chamber 12 to be made other than circular arcs so as to get the most desirable motion of the pump vanes as they move into and out of register with the inlet and discharge ports in a manner well-known in the art. In order to prevent leakage tangentially of the rotor between the pump discharge and the pump inlet ports, for example from port 13 to port 14, a sealing member 40 is provided extending longitudinally of the pump rotor 32 and movable in a slot 41 formed in the upper part of the pump casing and pressed downwardly into sealing engagement with the periphery of the pump rotor by means of a thin leaf spring 42. The sealing element 40 is preferably made of a semi-hard synthetic rubber compound which is unaffected by gasoline or similar fuels and, being freely floating, can accommodate itself to slight irregularities on the rotor surface, but still maintain an adequate seal between the pump inlet and discharge ports. For service as a fuel pump of the character described, where the maximum fuel pressures seldom exceed six pounds per square inch, this seal has been found very effective and substantially eliminates all leakage between the pump discharge and the pump inlet tangentially along the line of contact of the sealing element with the rotor 32.

The outer end of the pump casing 11 and pump chamber 12 is open, and the open end of the pump chamber is adapted to be closed by means of a circular sealing ring 45 which abuts in sealing engagement with the outer end face of the rotor 32 and the radial end faces of the pump vanes 35, the latter being arranged to come flush with the outer end face of the pump rotor. The sealing ring 45 may be made of any suitable material or composition such as Duralumin, cast iron or Bakelite and is secured against rotation relative to the pump casing by means of a pair of circular keys 46 which extend partially into the pump housing and into sealing disc 45, allowing the sealing disc however to move axially into engagement with the end face of the rotor 32. The open end of the casing 11 is adapted to be closed by means of a flexible diaphragm 47 made of synthetic rubber or other composition unaffected by gasoline or other fuel and the diaphragm 47 being maintained into tight sealing engagement with the rear face of the sealing disc 45 by means of a bearing disc 48 and a leaf spring 49 which yieldingly engages an annular end cover 50 secured to the casing 11 by means of suitable screws 51. The leaf spring 49 causes an axial pressure on the disc 48 which transfers this pressure through the flexible diaphragm 47 to the sealing disc 45 retaining the latter in tight sealing engagement with the end face of the rotor 32 and the radial faces of the pump vanes 35. The axial thrust of the spring 49 also maintains the inner end face of the rotor 32 in tight sealing engagement with the inner end wall of the pump chamber 12 and the inner radial end faces of the vanes 35 are held in sealing engagement with the end walls of the rotor slots 34, the slots being carefully ground so that the vanes 35 may reciprocate therein, but having a sufficiently small clearance so that any leakage radially inward along the vanes into the rotor pocket 33 is negligible, and the floating sealing disc 45 maintaining an adequate seal against leakage radially inward along the outer end face and the rotor 32 and the outer radial faces of the pump vanes 35. The flexible diaphragm 47 insures that there will be no leakage of the fluid from the pressure side of the pump axially into the annular end cover 50.

When the pump is in operation, and rotating for example in a clockwise direction as seen in Fig. 3, the pump will pick up fluid in the clearance space between the rotor and the walls of the pump chamber 12 between adjacent pairs of vanes and will transfer this fluid to the outlet side of the pump through the outlet port 13 developing pressure therein. Any adjacent pair of vanes form together with the clearance space therebetween at the periphery of the rotor an expansible chamber which expands as it comes into register with the pump inlet port, remains of substantially constant volume until it begins to register with the outlet port, and then decreasing in volume to zero as the vanes move away from the outlet port toward the inlet port. When the pump is delivering fuel under pressure a portion of the inner surface of the sealing member 45 adjacent its periphery is subjected to pressure of the fuel from the discharge port, which pressure causes an outward thrust on the sealing member and opposing the loading exerted thereon by means of the spring 49. To eliminate the necessity for using a very heavy spring to obtain the necessary sealing pressure on the sealing disc 45, fluid pressure is admitted to chamber 52 formed behind the flexible diaphragm 47 by means of the annular cover 50, this fluid under pressure being admitted to the chamber 52 as seen in Fig. 4 by means of one of two drilled ports 54 formed in the pump body 11 and each respectively communicating with one of the ports 13 and 14. The flexible diaphragm 47 is provided with a suitable aperture 55 adapted to register with one of the passages 54 to allow the passage of fluid under pressure therethrough to a blind passage 56 formed in the cover plate 50. A small drilled passage 57 in the cover plate connects the chamber 52 with the passage 56 so that the fluid under pressure from the discharge port acts on the diaphragm 47 to assist the spring 49 in maintaining a proper load on the sealing disc 45 and relieving the outward thrust on the sealing disc. The cover plate 50 and flexible diaphragm 47 may be rotated on assembly to have the aperture 55 and passage 56 to register with the proper one of the passages 54 which will communicate with the pressure side of the pump, depending on the direction of rotation of the pump. When the pump is being started the chamber 52 will be subjected to atmospheric pressure while the interior of the pump casing will be under suction so that the pressure within the chamber 52 will maintain an adequate sealing force when the pump is being primed.

Fig. 5 illustrates an improved form of seal for the end faces of the pump vanes of the pump of Fig. 2 and may be employed at one or both ends of a respective vane. To accommodate the seal the radial end face of the vane is slotted longitudinally as at 35a and is cut back or recessed as indicated at 35b. The resilient seal made of synthetic rubber and indicated generally by the reference numeral 60 is formed with a rectangular shank portion 61 which is adapted to be forced into the vane slot 35a and at its upper end the seal is provided with outwardly flared flange portions 62 which merge into the body portion and overlie the end faces of the recessed portion 35b of the vane 35 with a slight clearance on the rear face of the flanges. When assembled in the pump of Fig. 2 the contact face of the flanged portion of the seal 60 will extend well below the outer periphery of the rotor 32 and will form a cup shaped seal and as seen in Fig. 6 fluid under pressure from the discharge side of the pump can enter behind the forwardly moving flange portion 62 and force the flange into tight sealing engagement with the sealing disc 45, and as the vane moves out of register with the discharge port the flange 62 on the opposite side of the vane will be subject to the discharge pressure to maintain a continuous axial sealing pressure on at least one of the sealing flanges 62. The rectangular shank or body portion 61 of the seal 60 serves to prevent leakage along the slot 35a to the lower end of the pump vane and also serves to maintain a good sealing contact along its outer face with the sealing disc 45. When seals of the type shown in Fig. 6 are used at both ends of the vane it will of course be necessary to have the rotor slots 34 extend the full length of the rotor 32.

Although the novel features of the present invention are illustrated as being applied to a fluid pump it is to be understood that these features may also apply to fluid pressure actuated motors of the movable vane type and the term pump as employed in the claims is intended to also embrace fluid actuated motors of the same constructional character.

Although only preferred forms of the invention have been illustrated many changes therein will become apparent to those skilled in the art as falling within the scope of the invention as defined by the appended claim.

I claim:

In an expansible chamber device of the character having a vaned rotor therein with the vanes thereof radially movable therein, of means for sealing the radial edges of the vanes comprising, a slot extending along the radial face of each vane, a recessed portion adjacent the outer radial part of the vane, a resilient sealing member having a shank portion adapted to be inserted in the slot in said vane, said sealing member having outwardly flared and laterally extending flange portions adapted to overlie the recessed portion of the vane, the contact face of the flanges being cup-shaped and the rear face of the flanges having a clearance from the edges of the recessed portion of the vane to allow the action of fluid pressure thereon.

DAVID SAMIRAN.